United States Patent [19]
Canfield et al.

[11] Patent Number: 5,432,604
[45] Date of Patent: Jul. 11, 1995

[54] IONIC CONDUCTION BARRIER FOR RING LASER GYROSCOPE BODIES

[75] Inventors: John M. Canfield, Woodland Hills; Charles H. Volk, Newbury Park; James D. Assendrup, Thousand Oaks; Christine E. Geosling; Ann T. Nicol, both of Calabasas, all of Calif.

[73] Assignee: Litton Systems, Inc., Beverly Hills, Calif.

[21] Appl. No.: 28,175

[22] Filed: Mar. 9, 1993

[51] Int. Cl.⁶ ............................................. G01C 19/66
[52] U.S. Cl. ...................................... 356/350; 372/94
[58] Field of Search ......................... 356/350; 372/94

[56] References Cited

U.S. PATENT DOCUMENTS

| | | | |
|---|---|---|---|
| 4,733,966 | 3/1988 | Butler | 356/350 |
| 4,779,985 | 10/1988 | Wirt | 356/350 |
| 4,790,657 | 12/1988 | Kozma | 356/350 |
| 5,098,189 | 3/1992 | von Bieren | 356/350 |

OTHER PUBLICATIONS

A. P. Voitovich et al., "Properties of ring lasers containing optical elements with magnetic circular dichroism", Sov. J. Quantum Electron, vol. 8, No. 5 May 1978, pp. 555-559.

*Primary Examiner*—Samuel A. Turner
*Attorney, Agent, or Firm*—Lynn & Lynn

[57] ABSTRACT

A ring laser gyroscope has an electrically insulating barrier ring placed between the grounded metal mounting device and the frame, which is formed of a lithium aluminosilicate material that contains mobile ions. The barrier ring prevents migration of the ions from the frame material to the mirrors that are used to direct the counterpropagating waves around the closed path in the ring laser gyroscope.

8 Claims, 2 Drawing Sheets

IONIC CONDUCTION BARRIER FOR RING LASER GYROSCOPE BODIES

BACKGROUND OF THE INVENTION

This invention relates generally to rotation sensors and particularly to ring laser gyroscope rotation sensors. This invention particularly relates to apparatus and methods for preventing degradation of laser intensity caused by ionic conduction between a ring laser gyroscope body and the gas plasma.

A ring laser gyroscope employs the Sagnac effect to measure rotation. Two counterpropagating light beams in a closed path will have transit times that differ in direct proportion to the rotation rate about an axis perpendicular to the plane of the path. In a ring laser gyroscope the closed path is defined by mirrors that direct the light beams around the path. The mirrors must be precisely aligned to direct the light beams around the closed path. The mirror surface must be free of impurities to provide a laser beam intensity that will result in a usable signal.

The closed path is typically in a cavity formed in a frame or body that is formed of a glass ceramic material. The preferred glass ceramic material has a near zero coefficient of thermal expansion over the operating temperature range of a ring laser gyroscope. The glass ceramic preferred for ring laser applications is formed of a lithium alumino-silicate (LAS) material. The cavity is evacuated and then filled with a mixture of helium and neon, which is the gain medium for the laser.

In a typical application, a mounting device is used to mechanically attach the ring laser gyroscope body to a chassis or system block, which is mounted to the device for which rotations are to be measured. In some applications the mounting device is mechanically dithered to reduce the effects of lock-in errors that occur when the rotation rate is near zero. The mounting device is typically formed of a metal and is electrically grounded.

The inventors have observed that ring laser gyro sensors typically have a significant decrease in laser beam intensity after about 1000 hours of operation at elevated temperatures. The processes that cause this phenomenon constitute a life-limiting mechanism for ring laser gyroscopes operating at normal operating temperatures.

SUMMARY OF THE INVENTION

A ring laser gyroscope includes a frame having a central mounting cavity, or bore, therein. The purpose of the central cavity is to permit a mounting device to be placed between the frame and a pedestal or the like that is in turn connected to the device for which rotations are to be measured. A ring formed of an electrically insulating material is mounted in the central cavity, and the mounting device is placed inside the ring. The electrically insulating ring thus prevents electrical conduction due to movement of ions in the LAS body between the metal mounting device and the frame. Preventing such conduction has resulted in a ring laser that does not have the problem of laser intensity degradation inherent in previous ring laser gyroscope structures.

An appreciation of the objectives of the present invention and a more complete understanding of its structure and method of operation may be had by studying the following description of the preferred embodiment and by referring to the accompanying drawings.

DESCRIPTION OF THE PREFERRED EMBODIMENT

Figure 1:
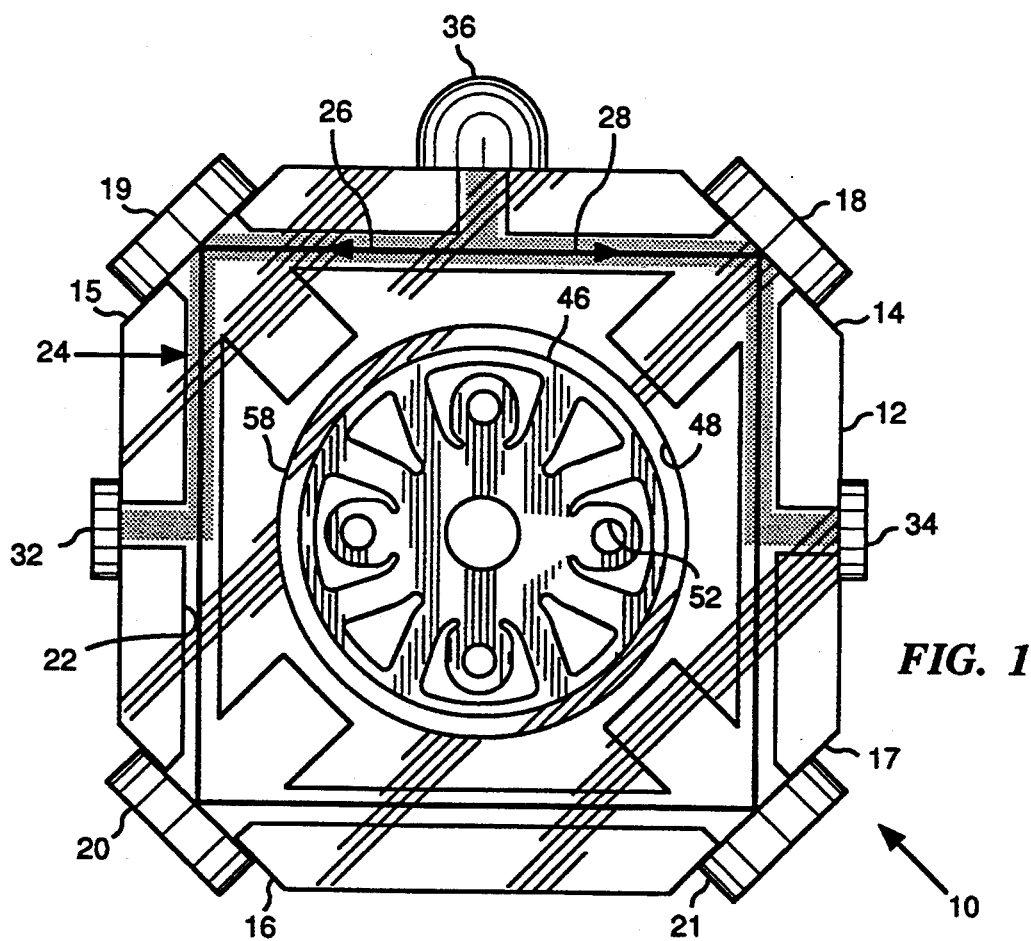
FIG. 1 is a plan view of a ring laser gyroscope showing an insulating ring connected between a ring laser gyroscope frame and a mounting device.
Figure 2:
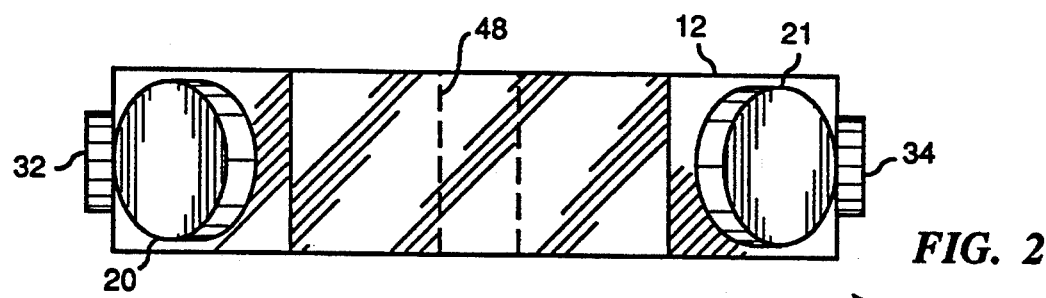
FIG. 2 is a front elevation view of the ring laser gyroscope of FIG. 1.

Referring to FIG. 1, a ring laser gyroscope 10 includes a frame 12 that has a generally rectangular shape with the corners cut off to form four mounting faces 14–17. A plurality of mirrors 18–21 are mounted on the mounting faces 14–17, respectively. A cavity 22 is formed in the frame 12 to form a rectangular path around the frame 12 between the mirrors 18–21. Other structures may be used for the ring laser gyroscope 10. In particular, the ring laser gyroscope may have a triangular configuration (not shown) with three mirrors, or it may have more than four mirrors. The basic description of the ring laser gyroscope 10 is presented by way of example and not for limitation of the present invention to a particular ring laser gyroscope structure.

A gain medium is positioned in the cavity 22. The gain medium is typically a mixture of helium and neon, which, when electrically excited, produces counterpropagating light beams 26 and 28 in the cavity 22. A plasma discharge is confined to a region 24 of the cavity 22. Energy is delivered to the gain medium by a power supply (not shown) which applies suitable voltages to a pair of anodes 32 and 34 and to a cathode 36.

The mirrors 18 and 19 may be partially transmissive to allow part of the light beams to exit the cavity for processing to determine the rotation rate. The mirrors 20 and 21 generally are movable by suitable actuators (not shown) for maintaining the path length of the light beams in the cavity 22 at a value selected to provide resonance at a wavelength of light emitted by the gain medium.

The ring laser gyroscope 10 as shown in FIG. 1 includes a mounting device 46 placed in a central passage 48 in the frame 12. There are stringent requirements that the mounting device 46 must satisfy. The mounting device 46 must transmit essentially no thermal stresses to the frame 12 to avoid misalignment of the cavity 22 and distortions of the optical path length of the cavity 22 for the counterpropagating beams. The mounting device 46 includes a plurality of bores 52 therein for receiving fasteners such as bolts (not shown) for connecting the frame 12 to a case (not shown). In a typical ring laser gyroscope application the mounting device 46 is connected to electrical ground.

Figure 3:
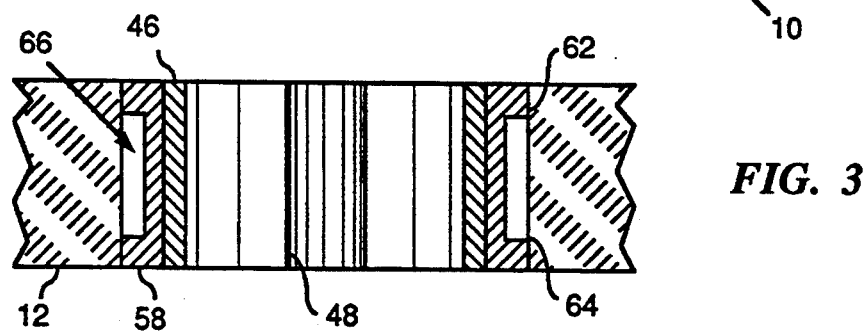
FIG. 3 is a cross sectional view taken along line 3—3 of FIG. 1 showing the insulating ring and side wall of the mounting device of FIG. 1.

Referring to FIGS. 1 and 3, a barrier ring 58 is placed between the mounting device 46 and the frame 12. The mounting device 46 is typically formed of a metal alloy known as super invar. The frame 12 typically includes substances that contain ions that contribute to the flow of electrical charge when a suitable potential difference is applied to the frame 12. The ring 58 is formed of an electrically insulating material to prevent charge flow between the metal mounting device 46 and the frame 12. The barrier ring 58 therefore prevents the flow of ions in the frame 12 to the plasma region of the cavity. Prior methods for securing mounting devices in ring laser gyroscope frames have the disadvantage of allowing electrical conduction between the frame and the metal flexure.

The barrier ring 58 may be formed generally as a cylinder. The barrier ring 58 preferably includes a pair of circumferential bosses 62 and 64 formed near the ends of the cylindrical flexure ring. The outer edges of the bosses 62 and 64 contact the wall of the passage 48. The barrier ring 58 and the wall of the passage 48 enclose a void 66 between the bosses 62 and 64. Having the points of contact between the frame 12 and the barrier ring 58 lie on the bosses 62 and 64 aids in minimizing distortion of the frame 12 as the temperature changes.

Figure 4:
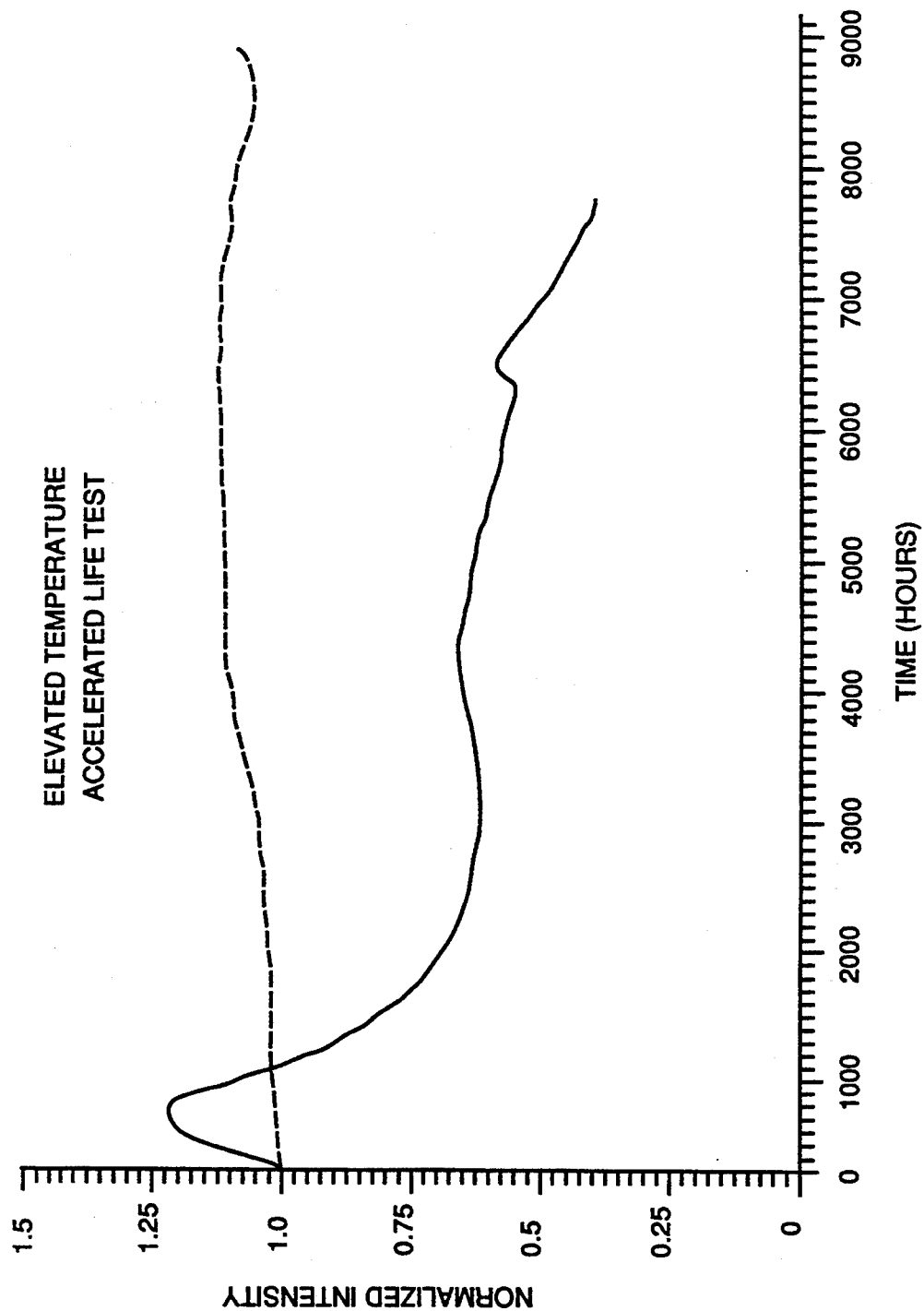
FIG. 4 graphically illustrates the intensity of a standard ring laser gyroscope and the intensity of a ring laser gyroscope having an insulating mounting ring as functions of time at elevated temperatures.

A problem that the inventors have observed with long-term use of ring laser gyroscope rotation sensors is consistent degradation of laser intensity during operation at elevated temperatures. This degradation of laser intensity is apparent for operation of a ring laser gyroscope at increasingly higher temperatures. The characteristics of this intensity degradation that have emerged from this testing are summarized as follows:

Ring laser gyroscopes exhibit a consistent intensity signature when operated hot such that at initial turn-on the intensity rises for several hundred hours and then declines. The solid line graph in FIG. 4 shows a typical intensity curve for a ring laser gyroscope at elevated temperature. It consists of an initial relatively short term rise in intensity followed by a long term decrease. This signature has been seen in 90° C. life tests as well as life tests at other temperatures.

The typical intensity signature is not observed for ring laser assemblies that are not connected to electrical ground. The typical intensity signature is observed for ring laser assemblies out of the case with a grounded flexure installed. The intensity signature is temperature dependent. At higher temperatures the turn-over point where the intensity stops rising and starts to declines appears sooner.

An embodiment of the barrier ring 58 fabricated of fused silica has been incorporated into a ring laser gyroscope, which was then placed on hot life test. The dashed line graph in FIG. 4 shows the normalized intensity as a function of time at a temperature of 90° C. The fused silica barrier ring 58 provides a high resistivity barrier between the frame 12 and the grounded mounting device 46, thereby limiting the migration of mobile ions in the frame 12. As can be seen, no loss of laser intensity has occurred. The 90° C. life test of a ring laser with the fused silica barrier ring 58 continues to show slightly rising intensity after 6000 hours.

In addition, the leakage current measured from the flexure to ground when the fused silica flexure ring is installed is more than three orders of magnitude less than that measured for standard ring laser gyroscope configurations.

The long term intensity decrease can be attributed to a process, similar to sputtering, which is driven by the presence of suitably directed electric fields. The process is accelerated by elevated temperatures. The intensity degradation is thus a field/temperature assisted contamination process. According to this mechanism, electric fields direct mobile ions (primarily lithium and sodium) in the frame material to the gain bores. This alkali-rich surface composition appears to be susceptible to removal of material by the plasma. This material, when transported to the surfaces of the mirrors, 18 and 19, deposits thereon and causes the finesse of the cavity to decrease.

The experimental evidence leads to the following mechanism: the intensity signature of a ring laser gyroscope is described by an initial increase in gain which levels off, after which the increasing cavity loss becomes the dominant driver of intensity change. Both the rate of gain increase and the rate of mirror loss increase are directly related to the magnitude of the mobile ion current in the laser body, which in turn is controlled by the magnitude and direction of the electric fields and the temperature of the laser body. This is consistent with a mechanism in which bore material is transported in the plasma to the laser mirrors 18 and 19.

Some constituents (e.g. lithium, sodium, etc.) used in various lithium aluminosilicate (LAS) formulations can migrate through the bulk of the LAS material under the influence of electric fields. The migration of these ions will result in depletion of ions in the anodic portions of the LAS material and an excess abundance in the cathodic portion of the material. The migration of these mobile ions will continue indefinitely as long as there is an available source of charge compensation. The change in materials brought about by the ion migration results in losses in laser intensity in the ring laser gyroscope.

This invention reduces and/or limits the migration of mobile ions in the LAS material and its source of charge compensation. The barrier ring may comprise any dielectric material such as fused silica, alumina, diamond, or other dielectric material which is inserted between any anodic portion of the LAS material and the charge compensation source (e.g. mechanical or electrical connections.)

The barrier ring may be constructed from bulk dielectric material and attached to either the LAS material or the charge compensating source by the use of conventional adhesives or fastening techniques.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. Apparatus for connecting a ring laser gyroscope having a frame formed of a material that includes mobile ions to a mounting device, the frame having a mounting cavity formed therein comprising a barrier ring formed of an electrically insulating material that comprises alumina mounted in the mounting cavity between the frame and the mounting device to prevent migration of mobile ions in the frame.

2. The apparatus of claim 1 wherein the barrier ring has the geometric configuration of a thin-walled cylinder.

3. The apparatus of claim 1 wherein the barrier ring has the geometric configuration of a thin-walled cylinder with a first circumferential boss being formed around the outer periphery of one end of the cylinder and a second circumferential boss being formed around the outer periphery of the other end of the cylinder such that outer edges of the first and second circumferential bosses contact the frame with a void being formed around the barrier ring between a central portion of the outer wall of the barrier ring and the frame.

4. Apparatus for connecting a ring laser gyroscope having a frame formed of a material that includes mobile ions to a mounting device, the frame having a mounting cavity formed therein comprising a barrier ring formed of an electrically insulating material that comprises diamond mounted in the mounting cavity between the frame and the mounting device to prevent migration of mobile ions in the frame.

5. A method for connecting a ring laser gyroscope having a frame formed of a material that includes mobile ions to a mounting device comprising the steps of:
forming a mounting cavity in the frame;
placing a barrier ring formed of an electrically insulating material comprising alumina in the mounting cavity; and
placing the mounting device inside the barrier ring such that the barrier ring is between the frame and the mounting device to prevent migration of mobile ions in the frame.

6. The method of claim 5 including the step of forming the barrier ring as a thin-walled cylinder.

7. The method of claim 5 including the steps of:
forming the barrier ring as a thin-walled cylinder;
forming a first circumferential boss around the outer periphery of one end of the cylinder; and
forming a second circumferential boss around the outer periphery of the other end of the cylinder such that outer edges of the first and second circumferential bosses contact the frame and form a void around the barrier ring between a central portion of the outer wall of the barrier ring and the frame.

8. A method for connecting a ring laser gyroscope having a frame formed of a material that includes mobile ions to a mounting device comprising the steps of:
forming a mounting cavity in the frame;
placing a barrier ring formed of an electrically insulating material comprising diamond in the mounting cavity; and
placing the mounting device inside the barrier ring such that the barrier ring is between the frame and the mounting device to prevent migration of mobile ions in the frame.

* * * * *